US011879469B2

(12) United States Patent
Losio

(10) Patent No.: US 11,879,469 B2
(45) Date of Patent: Jan. 23, 2024

(54) FLUSH-MOUNTED FAN SYSTEM

(71) Applicant: I.M.E. INDUSTRIA MOTORI ELECTTRICI S.p.A., Brescia (IT)

(72) Inventor: Giambattista Losio, Brescia (IT)

(73) Assignee: I.M.E. Industria Motori Elettrici S.P.A., Manerbio (IT)

( * ) Notice: Subject to any disclaimer, the term of this patent is extended or adjusted under 35 U.S.C. 154(b) by 451 days.

(21) Appl. No.: 16/622,039

(22) PCT Filed: Jun. 11, 2018

(86) PCT No.: PCT/IB2018/054205
§ 371 (c)(1),
(2) Date: Dec. 12, 2019

(87) PCT Pub. No.: WO2018/229628
PCT Pub. Date: Dec. 20, 2018

(65) Prior Publication Data
US 2020/0208640 A1 Jul. 2, 2020

(30) Foreign Application Priority Data
Jun. 16, 2017 (IT) .................... 102017000067309

(51) Int. Cl.
*F04D 19/00* (2006.01)
*H02K 11/33* (2016.01)
(Continued)

(52) U.S. Cl.
CPC ....... *F04D 19/002* (2013.01); *F04D 25/0613* (2013.01); *F04D 25/12* (2013.01);
(Continued)

(58) Field of Classification Search
CPC .... F04D 19/002; F04D 25/0613; F04D 25/12; F04D 29/522; F04D 25/08; H02K 11/33; H02K 21/22; H02K 7/14
See application file for complete search history.

(56) References Cited

U.S. PATENT DOCUMENTS 5,944,497 A * 8/1999 Kershaw ............. F04D 29/5806
417/368
6,384,494 B1 * 5/2002 Avidano ................. H02K 11/33
310/58

(Continued)

FOREIGN PATENT DOCUMENTS

CN 203504359 U 3/2014

OTHER PUBLICATIONS

International Search Report for International Patent Application No. PCT/IB2018/054205, dated Aug. 28, 2018, 2 pages.

*Primary Examiner* — Charles G Freay
*Assistant Examiner* — Lilya Pekarskaya
(74) *Attorney, Agent, or Firm* — Armstrong Teasdale LLP

(57) ABSTRACT

A flush-mounted fan system for an industrial ventilation system includes a fan device equipped with a blade group and an electric motor group. The electric motor group includes a drive shaft on which the blade group is mounted, an electric motor operatively connected to the drive shaft, and an electronic command device of the electric motor. The flush-mounted fan system also includes a flush-mounted frame housing the fan device including a flush-mounted box and a bracket group for supporting the fan device.

11 Claims, 7 Drawing Sheets

(51) Int. Cl.
*F04D 25/06* (2006.01)
*F04D 25/12* (2006.01)
*F04D 29/52* (2006.01)
*H02K 21/22* (2006.01)
*H02K 7/14* (2006.01)

(52) U.S. Cl.
CPC ........... *F04D 29/522* (2013.01); *H02K 11/33* (2016.01); *H02K 21/22* (2013.01); *H02K 7/14* (2013.01)

(56) References Cited

U.S. PATENT DOCUMENTS

| | | | |
|---|---|---|---|
| 8,157,524 B2* | 4/2012 | Niegorski | F04D 29/663 |
| | | | 416/169 A |
| 2010/0109465 A1 | 5/2010 | Yang et al. | |
| 2012/0104907 A1* | 5/2012 | Zeng | H02K 11/33 |
| | | | 310/68 R |
| 2012/0313466 A1* | 12/2012 | Eisert | H02K 7/14 |
| | | | 310/62 |
| 2015/0340923 A1* | 11/2015 | Lee | H02K 1/2791 |
| | | | 310/68 B |
| 2016/0146210 A1* | 5/2016 | De Filippis | F04D 29/5806 |
| | | | 416/93 R |
| 2016/0186771 A1* | 6/2016 | Evers | F04D 17/16 |
| | | | 416/90 R |
| 2016/0290346 A1* | 10/2016 | Watanabe | F04D 25/064 |
| 2017/0141642 A1* | 5/2017 | Geissler | H02K 5/207 |
| 2017/0310174 A1* | 10/2017 | Jang | H02K 1/28 |
| 2018/0145565 A1* | 5/2018 | Pozmantir | H02K 7/14 |
| 2019/0097486 A1* | 3/2019 | Ikeda | H02K 5/22 |

\* cited by examiner

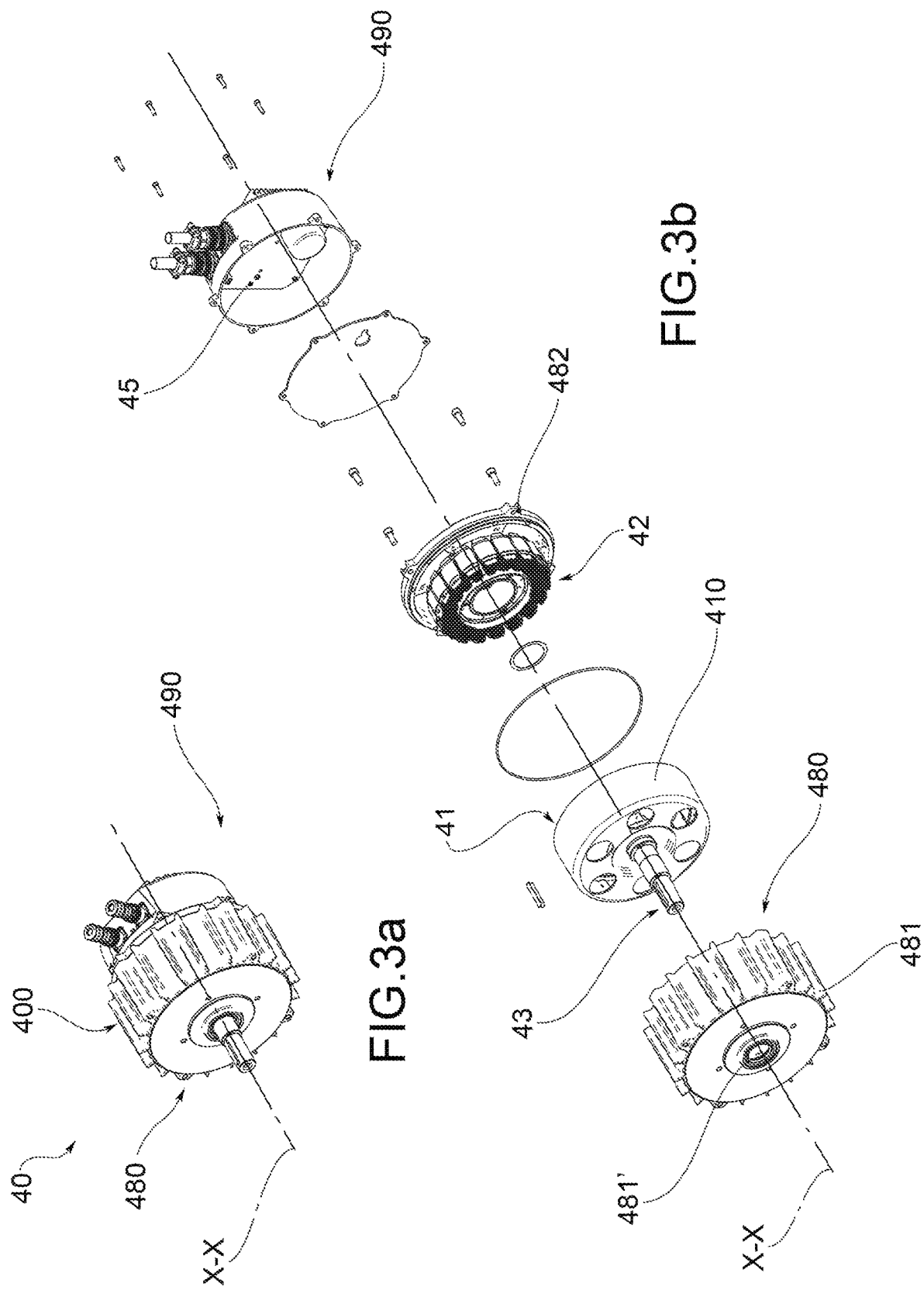

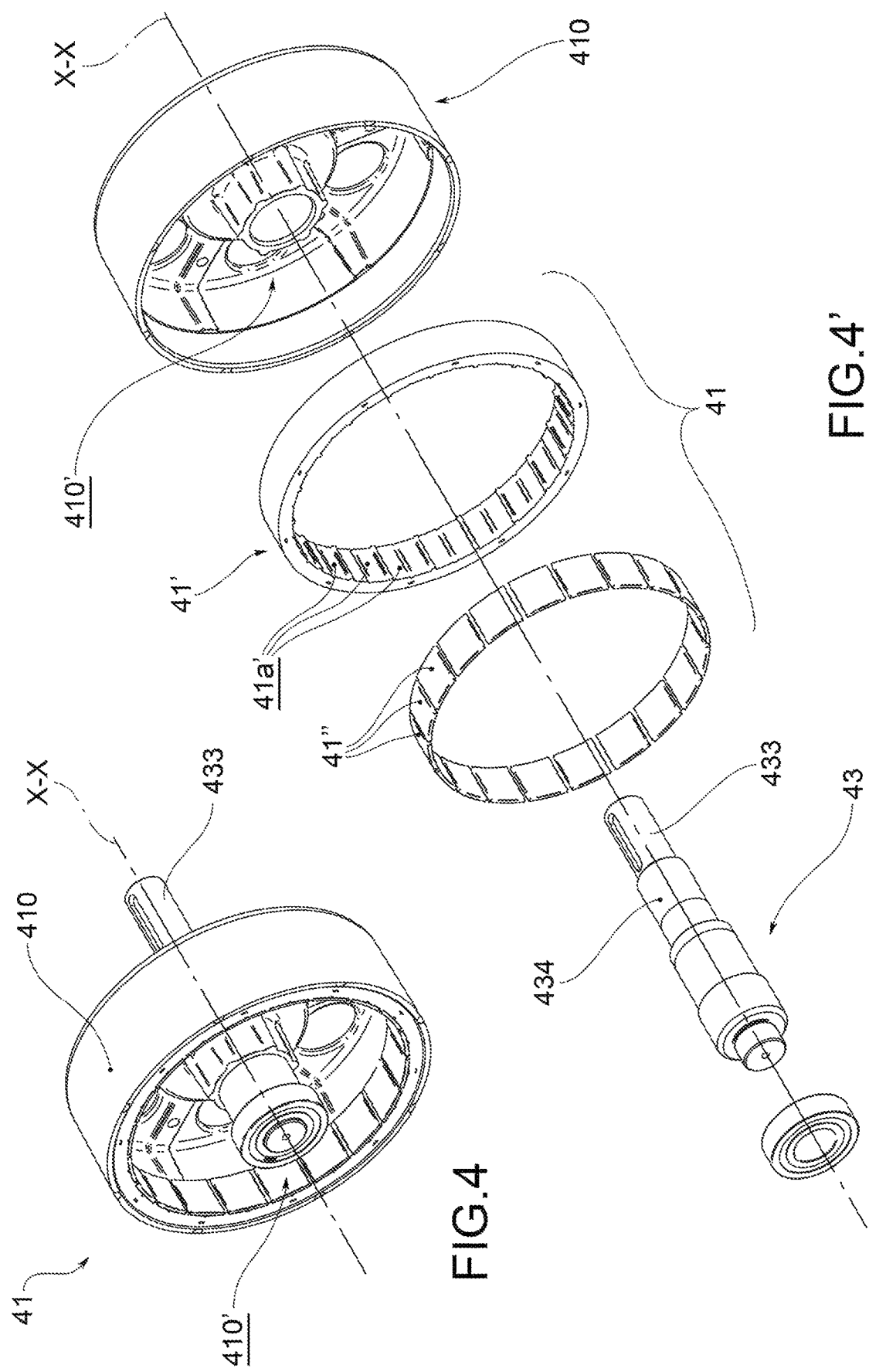

FLUSH-MOUNTED FAN SYSTEM

CROSS-REFERENCE TO RELATED APPLICATIONS

This application is a National Stage Application of International Patent Application No. PCT/IB2018/054205, filed Jun. 11, 2018, which claims the benefit of priority to Italian Patent Application No. 102017000067309, filed Jun. 16, 2017, the entire contents of which are hereby incorporated by reference herein.

FIELD OF THE DISCLOSURE

The present invention relates to a flush-mounted fan system.

In particular, the preferred application for the flush-mounted fan system is an industrial ventilation system. In fact, the flush-mounted fan system is suitable to be placed in an industrial ventilation circuit to command the recirculation of air. Specifically, industrial ventilation system refers to systems, for example, for cooling or heating, specifically intended for shopping centers, factories or offices.

BACKGROUND

In the state of the art, numerous types of flush-mounted fan systems are known which have a flush-mounted frame specially shaped to be housed in a ventilation system, for example, within system ducts or within wall openings fluidically connected with said ducts.

Such systems comprise a blade group, the rotation of which involves the movement of air. Typically, the blade group is driven in rotation by an electric drive having specific kinematic mechanisms comprising an asynchronous electric motor.

In fact, embodiments are known wherein an electric motor is mounted outside of the flush-mounted frame, or on the walls thereof, and, by means of a suitable kinematic mechanism, for example a belt, is operatively connected to the blade group to command the rotation thereof.

Flush-mounted fan systems have the disadvantage of comprising electric motors that operate with very low efficiency.

BRIEF DESCRIPTION

The object of the present invention is therefore to provide a flush-mounted fan system which resolves said problem, preferably by minimizing the kinematic chain which drives the blade group and operating with high efficiency.

Such object is achieved by means of a flush-mounted fan system in accordance with claim 1. The dependent claims show preferred variant embodiments and additional features entailing a series of new advantages.

BRIEF DESCRIPTION OF THE FIGURES

The object of the present invention will now be described in detail, with the aid of the accompanying figures, wherein:

FIGS. 3a and 3b respectively represent a perspective view and a perspective view in separate parts of a motor group, according to a preferred embodiment, comprised in the flush-mounted fan system;

FIGS. 4 and 4' respectively represent a perspective view and a perspective view in separated parts of a rotor, according to a preferred embodiment, comprised in the motor group in FIGS. 3a and 3b;

DETAILED DESCRIPTION

Figure 1:
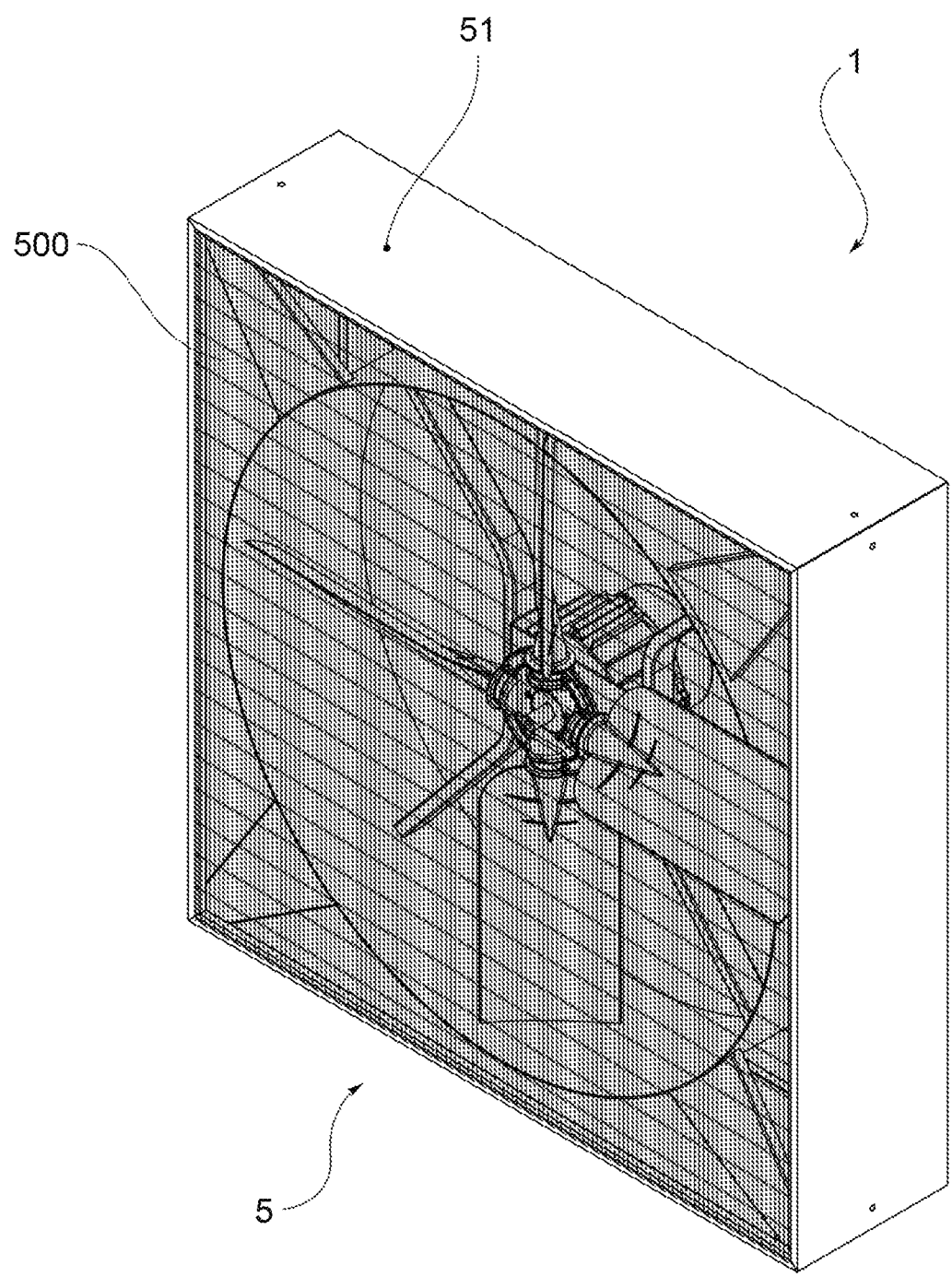
FIG. 1 shows a perspective view of the flush-mounted fan system object of the present invention, according to a preferred embodiment.
Figure 2:
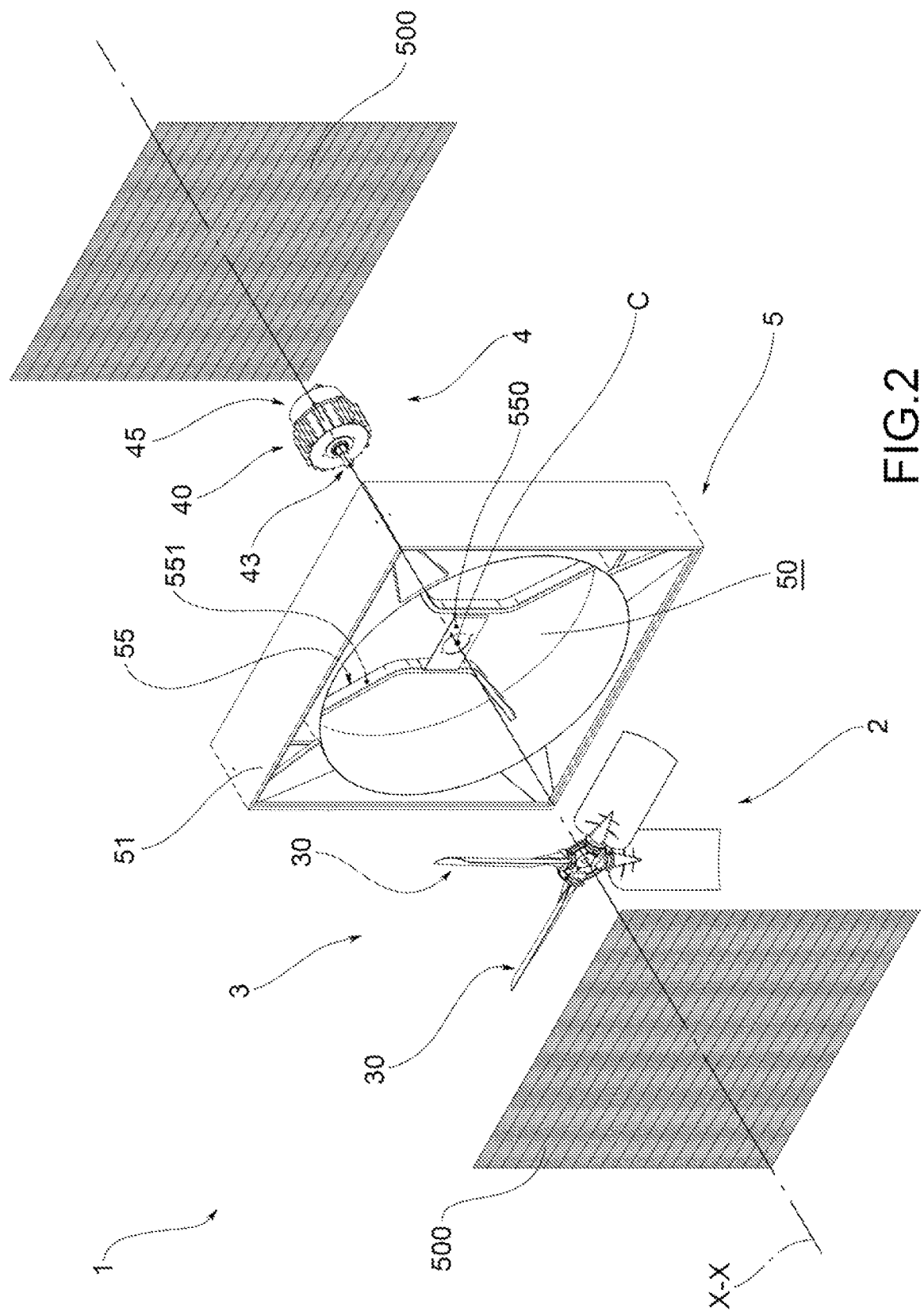
FIG. 2 shows a perspective view in separate parts of the flush-mounted fan system of FIG. 1.
Figure 5A:
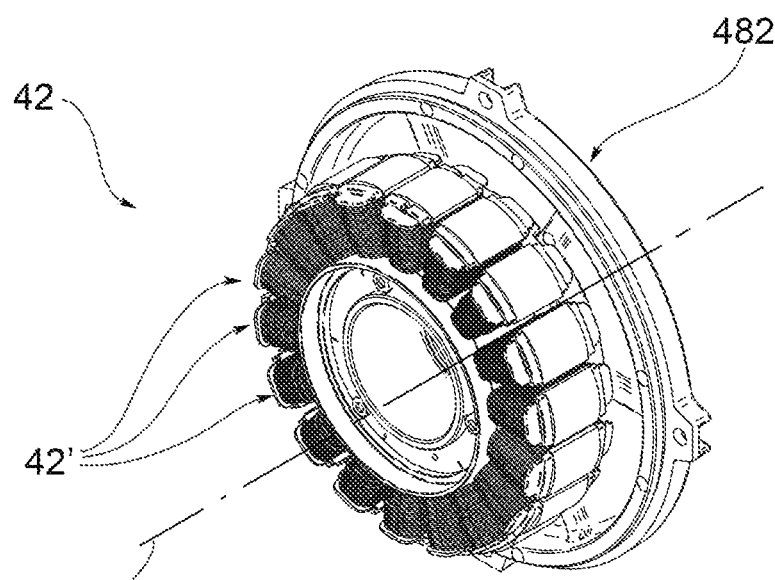
FIGS. 5a, 5a', 5b and 5b' represent perspective views and perspective views in separate parts of a stator, according to a preferred embodiment, comprised in the motor group in FIGS. 3a and 3b.
Figure 5A:
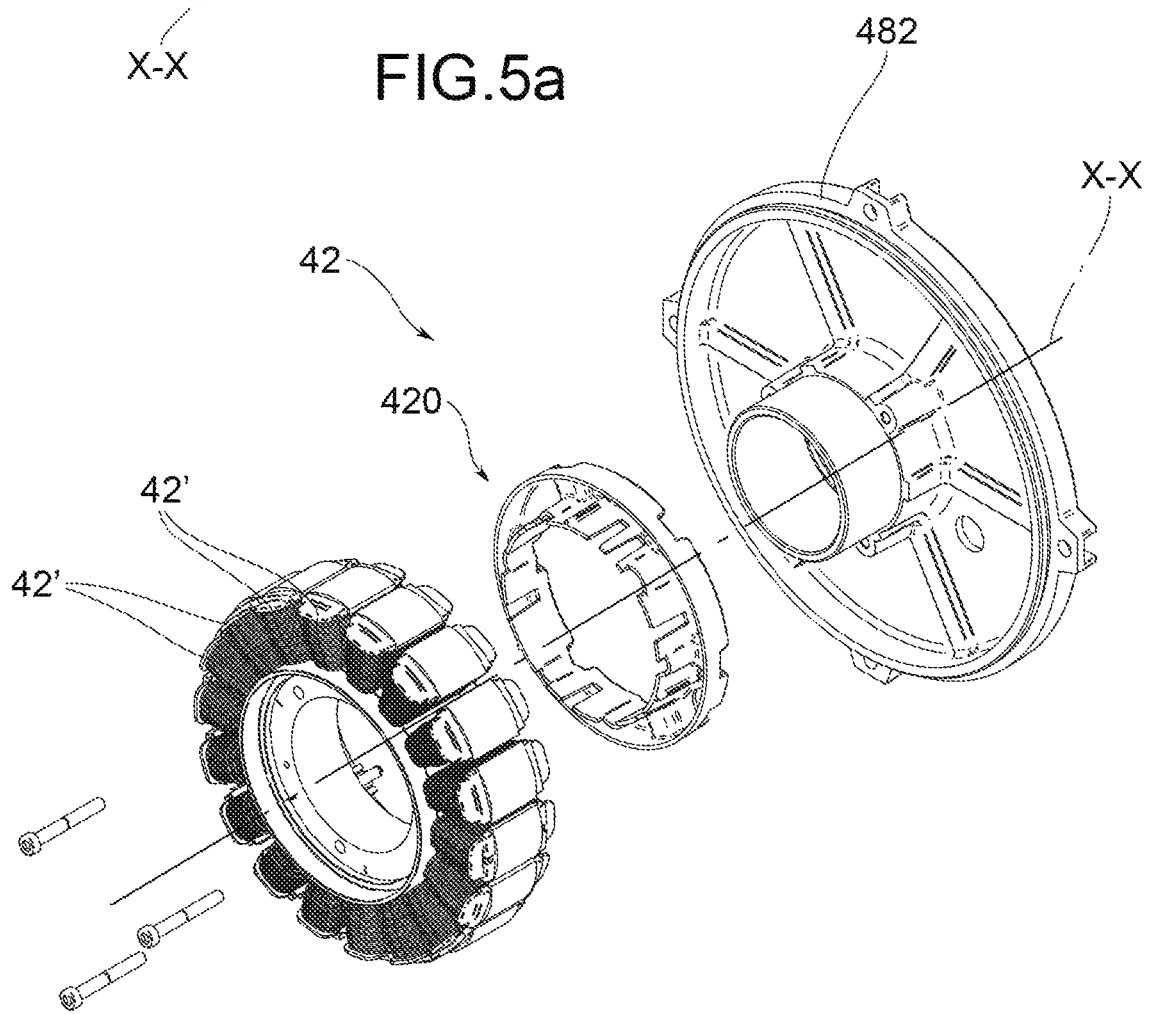
Figure 5B:
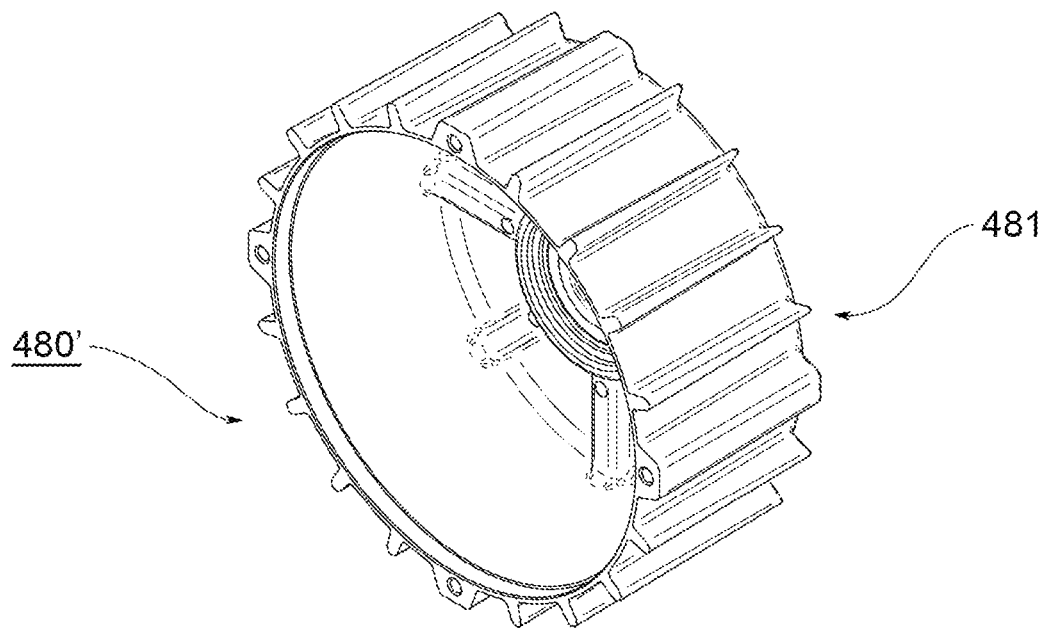
Figure 5B:
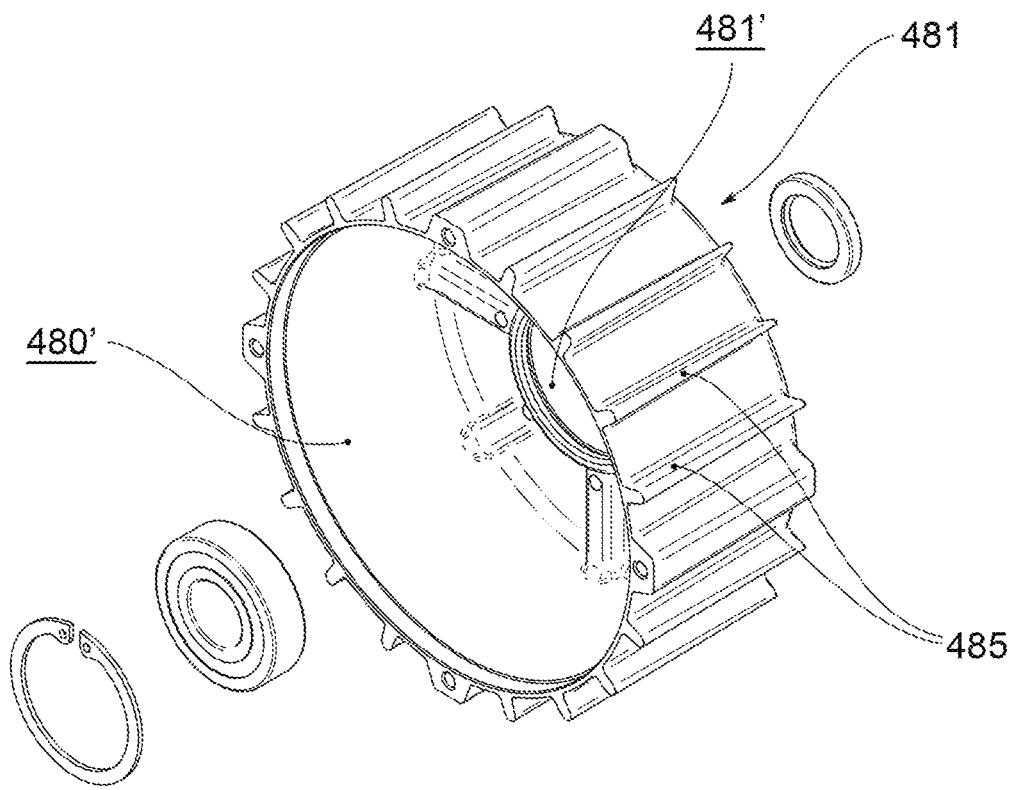
Figure 6A:
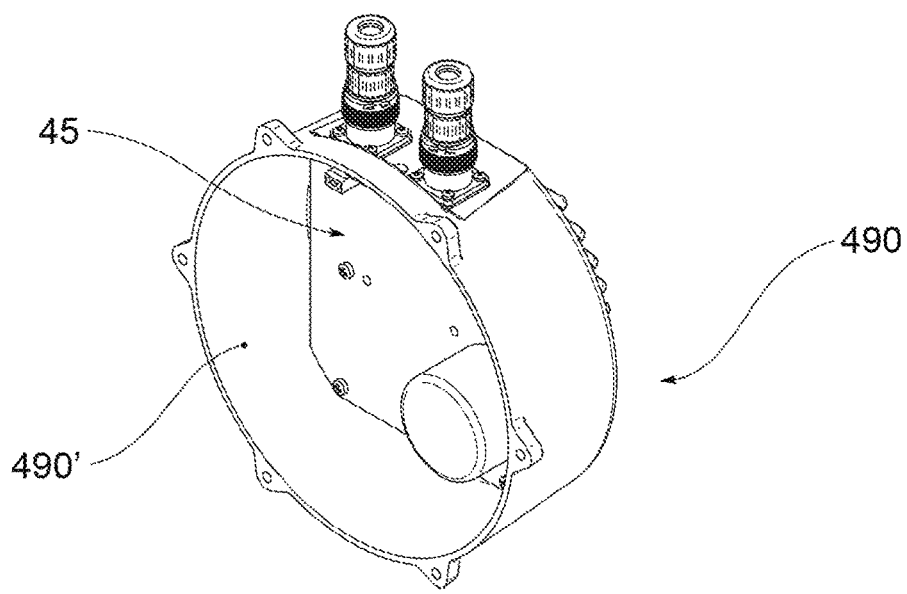
FIGS. 6a and 6a' respectively represent a perspective view and a perspective view in separated parts of a command casing, according to a preferred embodiment, comprised in the motor group of FIGS. 3a and 3b.
Figure 6A:
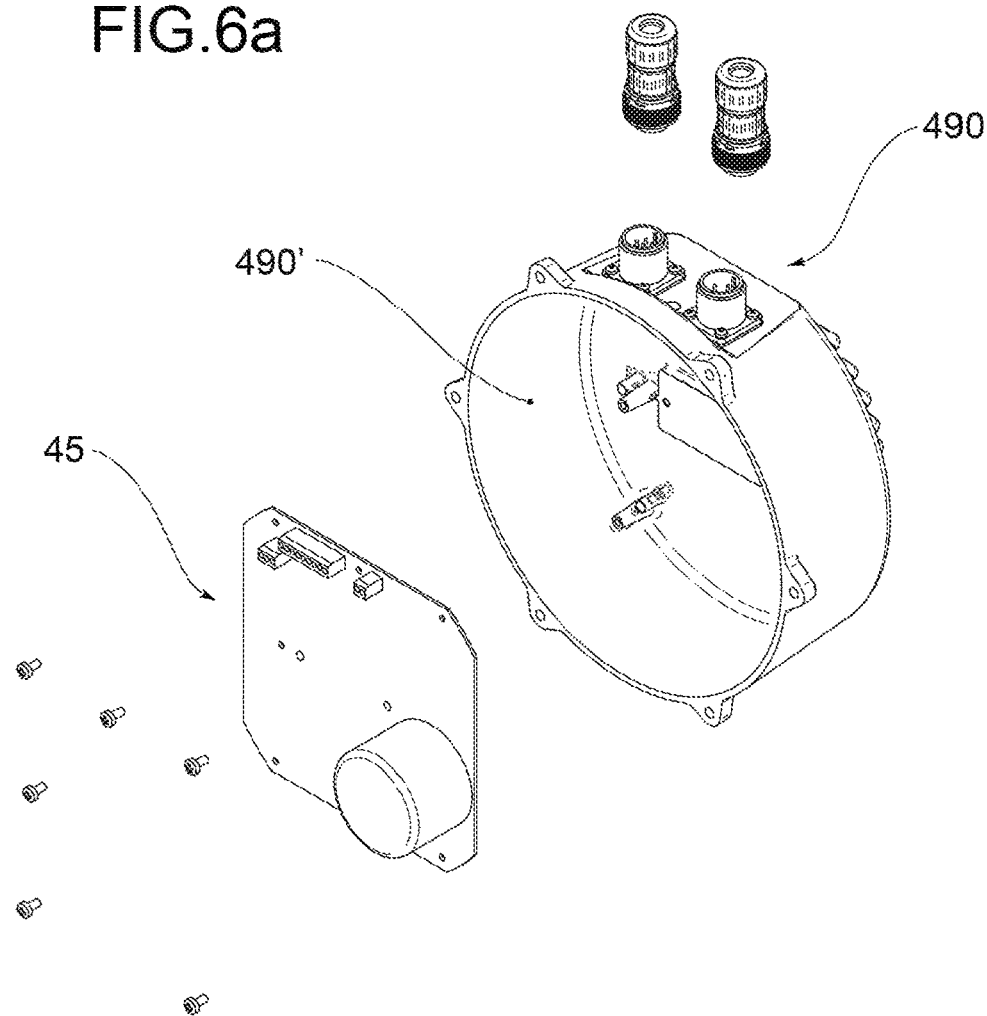

With reference to the aforesaid figures, a flush-mounted fan system for an industrial ventilation system is indicated collectively at reference number 1.

According to the object of the present invention, the flush-mounted fan system 1 comprises a fan device 2, hereinafter described in detail, and a flush-mounted frame 5 housing said fan device 2.

According to a preferred embodiment, the flush-mounted frame 5 is specially shaped to be accommodated in a housing comprised in the ventilation system. That is to say, the flush-mounted frame 5 has a shape substantially complementary to the shape of the respective housing. In an embodiment such as that shown in the accompanying figures, the flush-mounted frame 5 has a square shape suitable to be housed in a square-shaped housing.

Preferably, the flush-mounted frame 5 is suitable to allow the flush-mounted fan system 1 to be housed, for example, inside a duct of a ventilation system, or in an opening of a wall which is fluidically connected to a duct.

The flush-mounted frame 5 has a flush-mounted box 51 the outer perimeter walls 510 of which have a shape substantially complementary to the shape of the housing wherein the flush-mounted fan system must be housed, for example, a square shape.

According to a preferred embodiment, said outer walls 510 define the overall dimensions of the flush-mounted fan system 1 in its entirety.

Furthermore, the flush-mounted box 51, by means of its outer walls 510, defines a through opening 50 through which the air flows. The shape of said through opening is preferably circular.

Preferably, said through opening 50 has an opening center C. In the embodiment wherein said through opening 50 is circular, such opening is concentric with the opening center C.

In addition, the flush-mounted frame 51 comprises a bracket group 55 housed in the through opening 50 having the purpose of supporting the fan device 2 within the through opening. In particular, said bracket group 55 is made in such a way as to keep the internal fan device 2 positioned substantially in the opening center C, as described hereinafter and shown in the figures in the annex.

In other words, the fan device 2, in its entirety, is supported by the flush-mounted frame 51 and in particular by the bracket group 55 in a central position of the through opening 50 in such a manner as to be, in its entirety, interceptible by the air in transit within the through opening and therefore within the ventilation system.

According to a preferred embodiment, the bracket group 55 comprises a support plate 550 on which the fan device 2 is mounted. Preferably, the fan device 2 is, in fact, solidly mountable, for example, by means of screw-bolt means to said support plate 550.

Moreover, according to a preferred embodiment, the bracket group 55 comprises support arms 551 extending from the support plate 550 to the flush-mounted box 51, for example, to the outer walls which delimit the through opening 50. Preferably, said support arms 551 extend in a radial direction with respect to the opening center C.

According to a preferred embodiment, the bracket group 55 is a component obtained by means of plates and tubes respectively solidly joined, for example by welding.

According to a preferred embodiment, as shown by way of example in the accompanying figures and described hereinafter, the fan device 2 identifies a main axis X-X with respect to which the various components included therein are arranged. According to what has been described, the fan device 2 is mounted on the bracket group 55 in a manner such that the main axis X-X and the opening center C correspond: when viewed from the front, the main axis X-X and the opening center coincide.

Entering into the merits of the preferred embodiment of the fan device 2, comprised in the flush-mounted fan system 1 object of the present invention, this comprises a blade group 3 and an electric motor group 4.

Said blade group 3 is commandable in rotation about the main axis X-X, already cited.

The electric motor group 4 is specifically adapted to command the blade group 3 in rotation.

According to a preferred embodiment, the blade group 3 comprises a plurality of shaped blades 30 for moving the air in a preferred axial direction. Preferably, the blade group 3 moves the air through the through opening 50 in a direction parallel to the direction along which said through opening 50 extends in length. Preferably, the air is moved in an axial direction substantially parallel to the main axis X-X.

According to a preferred embodiment, the blade group 3 moves the air in a direction of aspiration. In other words, the blade group 3 moves the air towards the electric motor group 4.

According to the present invention, the electric motor group 4 extends along the main axis X-X comprising a plurality of components.

In fact, the electric motor group 4 comprises a drive shaft 43 which extends along said main axis X-X to which the blade group 3 is solidly connected. Preferably, the drive shaft 43 comprises a blade end 433 to which the blade group 3 is solidly connected, for example by positive mechanical engagement or by an axial tab, in such a manner that a rotation of the drive shaft 43 corresponds to a rotation of the blade group 3. In addition, the drive shaft 43 comprises a drive portion 434, commandable in rotation.

The electric motor group 4 comprises, in fact, an electric motor 40 operatively connected to the drive shaft 43 for example in said command end 434.

According to the present invention, moreover, the electric motor group 4 also comprises an electronic command device 45 suitable for electrically commanding the electric motor 40 and commanding the rotation of the drive shaft 43.

According to a preferred embodiment, the electric motor 40 comprises a rotor 41 and a stator 42, respectively, connected to each other electrically.

Said rotor 41 is operatively connected to the drive shaft 43, for example, at its command portion 434, to command it in rotation.

According to a preferred embodiment of the present invention, the rotor 41 is of the external rotor type.

Preferably, the rotor 41 extends about the main axis X-X, about the stator 42. Preferably, also the stator 42 extends about the main axis X-X preferably about the drive shaft 43.

According to a preferred embodiment, the electric motor 40 comprises a rotor bell 410 on which the rotor 41 is housed.

Preferably, said rotor bell 410 is solidly connected to the drive shaft 43; for example, the two components are mutually in positive mechanical engagement in the command portion 434 of the drive shaft 43.

According to such embodiment, a rotation of the rotor bell 410 corresponds to a rotation of the drive shaft 43.

According to a preferred embodiment, the rotor bell 410 defines a bell cavity 410' wherein the rotor 41 is housed.

Preferably, the rotor 41 comprises, in fact, an annular support member 41' and a plurality of rotor magnets 41" housed angularly spaced on said support member 41' in specially shaped rotor slots 41a'.

Preferably, the stator 42 has slot concentrated electrical windings 42'.

According to a preferred embodiment, moreover, the stator 42 comprises a cable insulation cap 420 suitable to insulate and protect the slot concentrated electrical windings 42', in particular, the electrical power contacts comprised therein.

Preferably, therefore, the slot concentrated electrical windings 42' are protected and electrically insulated from the external environment.

Preferably, the stator 42 is electrically connected to the aforementioned electronic command device 45, in such a way that the latter supplies power to the stator poles 42 and therefore commands the magnetic field which moves the rotor 41 in rotation.

According to the embodiments described above, the rotor 41 comprises twenty rotor poles (i.e. magnets) and the stator 42 comprises eighteen stator poles (i.e. pole expansions of the stator).

According to a further preferred embodiment, the electric motor 40 comprises a motor body 400 defining a motor casing 480 housing the electric motor 40 and a command casing 490 housing the electronic command device 45.

According to the preferred embodiment of the present invention, the motor casing 480 and the command casing 490 are arranged along the main axis X-X. That is to say that along the direction of the main axis X-X, the motor casing 480 and the command casing 490 are adjacent to each other.

Preferably, the motor casing 480 is comprised between the blade group 3 and the command casing 490.

According to the aforesaid preferred embodiment, the rotor bell 410 is housed in said motor casing 480. Preferably, the motor casing 480 has a through hole 481' penetrated by the drive shaft 43.

According to a preferred embodiment, the motor casing 480 comprises a first shell 481 and a second shell 482, which are sealingly engageable to each other, defining a motor chamber 480'. Said motor chamber 480' houses the electric motor 40 described above in such a way that the blade end 433 protrudes from said motor casing 480 to be engaged by the blade group 3.

According to a preferred embodiment, the motor chamber 480' is sealed from the external environment. Preferably, the motor casing 480 in fact comprises special static and dynamic gasket elements 492, 494 suitable to limit actions from the external environment.

According to a preferred embodiment, the motor casing 480 comprises, on the outer surface thereof, motor blades 485 for dissipating the heat inside the motor casing 480.

According to a preferred embodiment, the motor casing 480 has a substantially axial-symmetrical extension with respect to the main axis X-X.

According to a preferred embodiment, the command casing 490 defines a command chamber 490' sealed from the external environment, wherein the electronic command device 45 is housed. Preferably, the command casing 490 is in fact provided with special gaskets suitable to prevent dirt and water (i.e. moisture) from entering the command casing 49.

According to the present invention, the electronic command device 45 comprises a command inverter which commands the AC power supply of the stator 42. In other words, the command inverter is suitable for commanding the power supply of the stator 42 with a sinusoidal signal current or with a trapezoidal signal current.

According to a further preferred embodiment, moreover, as a function of the needs, the flush-mounted frame 5 comprises at least one protective grid 500 adapted to allow the passage of the air moved by the blade group 3, preventing access to the fan group 2 housed in the flush-mounted frame 5.

Preferably, there are two of said protective grids 500, which are placed at the two axial ends of the central opening 50 defined in the flush-mounted frame 5.

Innovatively, the flush-mounted fan system object of the present invention presents a solution to the problem of the prior art, providing a fan system with a simple geometry, but above all having a high-efficiency electric motor.

Advantageously, the whole fan device 2 is positioned at the center of the central through opening which is penetrated by the air.

Moreover, advantageously, in fact, the electric motor group is arranged in its entirety at the center of the through opening. The electronic command device is also an integral part of the electric motor and is located in the passage area of the air flow.

Advantageously, the electric motor group is completely bathed by the air flow; advantageously, the electric motor group is cooled by the moving air itself.

Moreover, advantageously, the electric motor group is in direct contact with the blade group.

A further advantageous aspect resides in the fact that the electric motor group comprises an external rotor the dimensions of which (and in particular the diameter thereof) are designable as required. Advantageously, compared to embodiments wherein the electric motor has an internal rotor, the embodiment with an external rotor has a higher torque.

An even further advantageous aspect consists in the fact that the electric motor group has particularly compact dimensions. Preferably, the motor group has an axial size on the order of 10-20 cm. Advantageously, therefore, the flush-mounted fan system has a motor group which does not overhang axially in an excessive way with respect to the support bracket to which it is mounted.

Specifically, such advantage is be achievable with rotors of large dimensions (i.e. diameter). In other words, advantageously, the flush-mounted fan system has an axial dimension which allows a simple housing in the proposed seats (the dimensions of which are in turn compact).

Advantageously, although it is located inside the through opening of the flush-mounted frame, the motor group is not an obstacle to the air flow.

Advantageously, the flush-mounted fan system is equipped with an electric motor group with compact dimensions, but with high power. Advantageously, the electric motor group has a torque maximized to the maximum thus obtaining high efficiency, on the order of 90%.

Advantageously, the containment casings of the motor components are suitable for protecting the components sealingly contained therein, preventing the entry of water (moisture) and dust. Advantageously, in this way, even delicate components such as the electronic command device have been integrated within the motor group even though this is bathed by the flow of circulating air.

Advantageously, the motor group exhibits an increase in durability during its useful life, since its components are protected from agents causing wear or malfunction.

Advantageously, due to the electronic command device, the electric motor is connectable to a power supply of 200V or 500V.

To the embodiments of said system, one skilled in the art, in order to meet specific needs, may make variations or substitutions of elements with other functionally equivalent ones.

These variants are also contained within the scope of protection as defined by the following claims.

Furthermore, each variant described as belonging to a possible embodiment may be achieved independently of the other described variants.

The invention claimed is:

1. A flush-mounted fan system of an industrial ventilation system, the fan system comprising:
   a fan device comprising a blade group commandable in rotation about a main axis (X-X) and an electric motor group extending along the main axis (X-X) comprising:
   i) a drive shaft extending along the main axis (X-X) having a blade end to which the blade group is solidly connected;
   ii) an electric motor comprising a rotor of an external rotor type and a stator, wherein the rotor is operatively connected to the drive shaft; and
   iii) an electronic command device of the electric motor positioned along the main axis (X-X),
   wherein the electric motor comprises a motor body, which is defining along the main axis (X-X) a motor casing housing the electric motor and a command casing housing the electronic command device, wherein the motor casing is positioned between the blade group and the command casing, wherein the electric motor further comprises a rotor bell on which the rotor is housed, wherein the rotor bell is housed in the motor casing, and wherein the drive shaft is solidly connected to the rotor bell such that a rotation of the rotor bell corresponds to a rotation of the drive shaft,
   wherein the motor casing comprises a first shell, a second shell, at least one first gasket, and at least one second gasket, wherein the first shell and the second shell are sealingly engaged with each other via the at least one first gasket and the at least one second gasket and define a motor chamber in which the rotor and the stator are contained, wherein the first shell surrounds the rotor bell, wherein the command casing is coupled to the second shell, and wherein the at least one first gasket and the at least one second gasket restrict entry of debris and moisture into the motor casing; and
   a flush-mounted frame housing the fan device, the frame comprising:

m) a flush-mounted box defining a through opening identifying an opening center (C); and n) a bracket group housed in the through opening supporting the fan device in such a way that the main axis (X-X) and the opening center (C) correspond.

2. The flush-mounted fan system according to claim 1, wherein the rotor comprises an annular support member and a plurality of rotor magnets housed angularly spaced on the annular support member in specially shaped rotor slots.

3. The flush-mounted fan system according to claim 1, wherein the stator has slot concentrated electrical windings.

4. The flush-mounted fan system according to claim 3, wherein the stator comprises a cable insulation cap suitable to insulate and protect the slot concentrated electrical windings.

5. The flush-mounted fan system according to claim 1, wherein the rotor comprises eighteen or twenty rotor poles, and the stator comprises eighteen or twenty stator poles.

6. The flush-mounted fan system according to claim 1, wherein the command casing defines a command chamber that is sealed with respect to an external environment in which the electronic command device is housed.

7. The flush-mounted fan system according to claim 1, wherein the electronic command device comprises a command inverter that controls a power supply of the stator with alternating current.

8. The flush-mounted fan system according to claim 1, wherein the blade group comprises a plurality of shaped blades for moving air in an axial direction parallel to the main axis (X-X).

9. The flush-mounted an system according to claim 1, wherein the bracket group comprises a support plate, wherein a ventilation device is mounted on the support plate and support arms extending from the support plate to the flush-mounted box.

10. The flush-mounted fan system according to claim 4, wherein the cable insulation cap is suitable to insulate and protect electrical power contacts of the slot concentrated electrical windings.

11. The flush-mounted fan system according to claim 8, wherein the plurality of shaped blades is configured to move the air in a direction of aspiration parallel to the main axis (X-X).

* * * * *